(12) United States Patent
McCullough et al.

(10) Patent No.: US 12,435,684 B2
(45) Date of Patent: Oct. 7, 2025

(54) ATMOSPHERIC RE-ENTRY VEHICLE WITH SKEWED BASE HEAT SHIELD

(71) Applicant: STOKE Space Technologies, Inc., Kent, WA (US)

(72) Inventors: Thomas Ryan McCullough, Seattle, WA (US); Thomas Feldman, Kent, WA (US)

(*) Notice: Subject to any disclaimer, the term of this patent is extended or adjusted under 35 U.S.C. 154(b) by 0 days.

(21) Appl. No.: 18/930,844

(22) Filed: Oct. 29, 2024

(65) Prior Publication Data
US 2025/0052212 A1 Feb. 13, 2025

Related U.S. Application Data

(63) Continuation of application No. 18/554,587, filed as application No. PCT/US2022/071686 on Apr. 13, 2022.
(Continued)

(51) Int. Cl.
F02K 9/97 (2006.01)
B64G 1/00 (2006.01)
(Continued)

(52) U.S. Cl.
CPC ............ F02K 9/97 (2013.01); B64G 1/006 (2023.08); B64G 1/401 (2013.01); B64G 1/58 (2013.01);
(Continued)

(58) Field of Classification Search
CPC .. F02K 9/97; F02K 9/88; B64G 1/401; B64G 1/58; B64G 1/006; B64G 1/62;
(Continued)

(56) References Cited

U.S. PATENT DOCUMENTS 3,093,346 A 6/1963 Faget et al.
D201,773 S 7/1965 Bond
(Continued)

FOREIGN PATENT DOCUMENTS

CN 102828851 A 12/2012
CN 209637832 U 11/2019
(Continued)

OTHER PUBLICATIONS

Campbell, J., Jr. and Cobb, S. M., Aerospike Thrust Chamber Program—Final Report, Rockwell International Corp. Canoga Park, CA, United States, Published Dec. 1, 1976, Report/Patent No. NASA-CR-135169/R76-189, Accession No. 77N21189: Funding Nos. Contract_Grant: NAS3-20076, 154 pages.
(Continued)

Primary Examiner — Valentina Xavier
(74) Attorney, Agent, or Firm — Patrick D. Duplessis

(57) ABSTRACT

An atmospheric re-entry vehicle includes a main body defining a forward end of the vehicle, a base defining an aft end of the vehicle, and a heat shield at the base. The heat shield includes a heat shield outer surface. The main body and the heat shield are configured such that a centerline of the heat shield is offset relative to a centerline of the main body. At least a portion of the heat shield outer surface is at least substantially axisymmetric relative to the centerline of the heat shield.

36 Claims, 7 Drawing Sheets

Related U.S. Application Data

(60) Provisional application No. 63/236,002, filed on Aug. 23, 2021, provisional application No. 63/174,323, filed on Apr. 13, 2021.

(51) Int. Cl.
*B64G 1/40* (2006.01)
*B64G 1/58* (2006.01)
*B64G 1/62* (2006.01)
*F02K 9/88* (2006.01)

(52) U.S. Cl.
CPC .................. *B64G 1/62* (2013.01); *F02K 9/88* (2013.01); *F05D 2220/80* (2013.01); *F05D 2240/15* (2013.01); *F05D 2250/73* (2013.01)

(58) Field of Classification Search
CPC ............. F05D 2220/80; F05D 2240/15; F05D 2250/73; F05D 2250/31
See application file for complete search history.

(56) References Cited

U.S. PATENT DOCUMENTS

| | | | |
|---|---|---|---|
| 3,270,501 | A | 9/1966 | Webb |
| 3,295,790 | A | 1/1967 | Bono |
| 3,606,212 | A | 9/1971 | Bradley et al. |
| 3,780,968 | A | 12/1973 | Parilla |
| 3,888,419 | A | 6/1975 | McCullough |
| 3,929,289 | A | 12/1975 | Kardon et al. |
| 4,273,304 | A | 6/1981 | Frosch et al. |
| 4,605,184 | A | 8/1986 | Kim |
| 4,802,629 | A | 2/1989 | Klees |
| 4,903,918 | A | 2/1990 | Park |
| 5,201,832 | A | 4/1993 | Porter |
| 5,463,866 | A | 11/1995 | Klees |
| 5,568,901 | A | 10/1996 | Stiennon |
| 6,059,235 | A | 5/2000 | Meissinger et al. |
| 6,119,985 | A | 9/2000 | Clapp |
| 6,213,431 | B1 | 4/2001 | Janeke |
| 6,516,605 | B1 | 2/2003 | Meholic |
| 6,964,154 | B1 | 11/2005 | Sackheim et al. |
| 7,431,242 | B1* | 10/2008 | Brown .................... B64G 1/62 244/158.9 |
| 8,256,203 | B1 | 9/2012 | Blackmon |
| 10,773,834 | B2 | 9/2020 | Mbamalu |
| 2005/0017132 | A1 | 1/2005 | Janeke |
| 2005/0188677 | A1 | 9/2005 | Nyberg et al. |
| 2006/0145020 | A1 | 7/2006 | Buehler |
| 2006/0219846 | A1 | 10/2006 | Johnson et al. |
| 2007/0012820 | A1 | 1/2007 | Buehler |
| 2007/0163227 | A1 | 7/2007 | Mano |
| 2008/0078884 | A1 | 4/2008 | Traboandt |
| 2009/0113873 | A1 | 5/2009 | Tweeton |
| 2009/0145134 | A1 | 6/2009 | Vuillamy et al. |
| 2012/0023893 | A1 | 2/2012 | Yoo et al. |
| 2012/0312927 | A1 | 12/2012 | Morris et al. |
| 2013/0160472 | A1 | 6/2013 | Klimpel |
| 2015/0285187 | A1 | 10/2015 | Sannino et al. |
| 2017/0138310 | A1 | 5/2017 | Villarreal et al. |
| 2018/0057191 | A1 | 3/2018 | Zhang |
| 2019/0003423 | A1 | 1/2019 | Pelfrey |
| 2019/0009933 | A1 | 1/2019 | Mbamalu |
| 2019/0257245 | A1 | 8/2019 | Duge et al. |
| 2020/0049103 | A1 | 2/2020 | Craddock |
| 2021/0404420 | A1* | 12/2021 | Johnson .................... F02K 9/97 |
| 2024/0151194 | A1* | 5/2024 | Fuller .................... F02K 9/974 |

FOREIGN PATENT DOCUMENTS

| | | |
|---|---|---|
| EP | 0677440 A1 | 10/1995 |
| FR | 2542698 A1 | 9/1984 |
| JP | H01164700 A | 6/1989 |
| JP | H-10-503731 A | 4/1998 |
| JP | 2016-500789 A | 1/2016 |

OTHER PUBLICATIONS

Advanced Aerodynamic Spike Configurations, Technical Report, Rocketdyne Canoga Park CA Canoga Park, Silver, Roy, Nov. 1, 1966 AccessionNo. AD0378296, 411 pages.
Bono, P., "The Case for Ballistic Recovery of Boosters," SAE Technical Paper 670382, 1967, https://doi.org/10.4271/670382, 17 pages.
G. Esnault and F. Rossi, "Design and Cfd Analysis of the LOX/LCH4 Dual Regenerative Cooling Circuit of the DEMOP1 Demonstrator," Pangea Aerospace, Calle Roc Boronat, 117, 08018 Barcelona, Spain.
NASA Technology Roadmaps, TA 9: Entry, Descent, and Landing Systems, Jul. 2015, 125 pages.
The M-1 Rocket Engine, Technical Report, Aeroject-General Corporation under Contract NAS 3-2555, 29 pages.
Charczenko, N., Hennessey, K. W., & United States. (1961). Investigation of a retrorocket exhausting from the nose of a blunt body into a supersonic free stream. Washington, D.C: National Aeronautics and Space Administration.
Romeo, D. J., Sterrett, J. R., United States., & Langley Research Center. (1963). Exploratory investigation of the effect of a forward-facing jet on the bow shock of a blunt body in a Mach No. 6 free stream. Washington, D.C: National Aeronautics and Space Administration.
Hall, Joshua N., "Optimized Dual Expander Aerospike Rocket" (2011). Theses and Dissertations. 1326. https://scholar.afit.edu/etd/1326.
Onofri, M., Calabro, M.J., Hagemann, G.S., Immich, H., Sacher, P.W., Nasuti, F., & Reijasse, P. (2006). Plug Nozzles: Summary of Flow Features and Engine Performance.
Rogers A (2023) Spacecraft Recycling: Unveiling the Potential of Reusable Rocket Technology. Adv Automob Eng. 12:225.
Scarborough, R. (1964). Recovery and Reuse of a Two Stage Launch Vehicle.
Danielson, T. (2017). Vehicle Integrated Aerospike for High Mass Mars Missions.
Korzun, A.M. (2008). Supersonic Retropropulsion Technology for Application to High Mass Mars Entry, Descent, and Landing.
Korte, J.J., Salas, A.O., Dunn, H.J., Alexandrov, N.M., Follett, W.W., Orient, G.E., & Hadid, A.H. (1997). Multidisciplinary Approach to Aerospike Nozzle Design.
Hefner, J.N., & Keyes, J.W. (1967). Effect of forward-facing jets on aerodynamic characteristics of blunt configurations at Mach 6. Journal of Spacecraft and Rockets, 4, 533-534.
Simmons, J. R. (2014). Design and Evaluation of Dual-Expander Aerospike nozzle Upper Stage Engine.
Berman, K. and Crimp, F.W., Jr. Performance of Plug-Type Rocket Exhaust Nozzles, ARS Journal, Jan. 1961, pp. 18-23.
Rao, G.V. (1961). Recent Developments in Rocket Nozzle Configurations. ARS Journal, 31, 1488-1494.
Aukerman, C.A. (1991). Plug nozzles: The ultimate customer driven propulsion system.
Koelle D E: "Entwicklungstendenzen Bei Raumtransport-Systemen", Zeitschrift Fur Flugwissenschaften Und Weltraumforschung, DFVLR. Koln, DE, vol. 16, No. 2, Apr. 1, 1992(Apr. 1, 1992), pp. 67-76, XP000268629, ISSN: 0342-068X.
Thornton E A: "Thermal Structures: Four Decades of Progress", Journal of Aircraft, AIAA—American Institute of Aeronautics and Astronautics, Inc, US, vol. 29, No. 3, May 1, 1992 (May 1, 1992), pp. 485 498, XP000274400, ISSN: 0021-8669.
G. Hanley and R. Bergeron. "An overview of the Satellite Power System—Transportation system," AIAA 1978-975. 14th Joint Propulsion Conference. Jul. 1978.
Bono, Phil. "The Case for Ballistic Recovery of Boosters." SAE Transactions, vol. 76, 1968, pp. 1479-1494. JSTOR, http://www.jstor.org/stable/44565034. Accessed Oct. 31, 2023.
Chistopher J. Cohan, Walter B. Olstad, Donald W. Patterson, and Robert Salkeld, Space Transportation Systems 1980-2000, Publisher: American Institute of Aeronautics and Astronautics (Jan. 1, 1978), 91 pages, ISBN 0-915928-27-2.

(56) References Cited

OTHER PUBLICATIONS

Wang, Ten-See. "Analysis of Linear Aerospike Plume-Induced X-33 Base-Heating Environment." Journal of Spacecraft and Rockets 36 (1998): 777-783.
"Rombus," Web page <http://www.astronautix.com/r/rombus.html>, 4 pages [retrieved on Mar. 20, 2023].
"SASSTO," Web page <http://www.astronautix.com/s/sassto.html>, 5 pages [retrieved on Mar. 20, 2023].
"Philip Bono Personal Papers," Web page <https://sandiegoairandspace.org/collection/item/philip-bono-personal-papers>, 5 pages [retrieved on Mar. 21, 2023].
Bono, et al.; Frontiers of Space: The Pocket Encyclopedia of Spaceflight in Color (London, Blandford Press, 1969), pp. 64-66, 68-72, 78, 147-63, 171, 180, 206-07, 246-47. ISBN 0-7137-3504-X.
Select photos from Flickr album entitled "Philip Bono Collection Image," uploaded Jun. 20, 2016 by user "SDASM Archives" [retrieved on Mar. 21, 2023]. Retrieved from Internet: <https://www.flickr.com/photos/sdasmarchives/albums/72157669057850210>.
Automated transcript from YouTube video entitled "How Stoke Space's Unique Rocket Works // Exclusive Tour & Interview," 21 pages, uploaded on Feb. 4, 2023 by user "Everyday Astronaut". Retrieved from Internet: <https:// www.youtube.com/watch?v=EY8nbSwjtEY&t=735s>.
Automated transcript from YouTube video entitled "We are Stoke Space", 2 pages, uploaded on Dec. 17, 2022 by user "Stoke Space". Retreived from Internet: <https://www.youtube.com/watch?v=VzqhZLgpiv0&t=46s>.
Angelino, Gianfranco; "Approximate Method for Plug Nozzle Design" ; AIAA Journal, vol. 2, Issue 10; Oct. 1964; 2 Pages.
Dnofri, Marcello, et al; "Plug Nozzles: Summary of Flow Features and Engine Performance"; 40th AIAA Aerospace Sciences Meeting & Exhibit; Reno, NV; Jan. 14, 2002; 27 Pages.
International Search Report and Written Opinion of the International Searching Authority; Application No. PCT/US 20/48178; Completed: Apr. 26, 2021; Mailing Date: May 5, 2021; 8 Pages.
International Search Report and Written Opinion of the International Searching Authority; Application No. PCT/US 20/48226; Completed: Nov. 12, 2020; Mailing Date: Dec. 15, 2020; 9 Pages.
International Search Report and Written Opinion of the International Searching Authority; Application No. PCT/ US2022/071686; Completed: Nov. 1, 2022; Mailing Date: Nov. 21, 2022; 7 Pages.
International Search Report and Written Opinion of the International Searching Authority; Application No. PCT/ US22/71688; Completed: Nov. 18, 2022; Mailing Date: Dec. 13, 2022; 6 Pages.
Wasko, Robert A.; "Performance of Annular Plug and Expansion-Deflection Nozzles Including External Flow Effects at Transonic Mach Numbers"; NASA Technical Note D-4462; Apr. 1968; 36 Pages [retrieved on Mar. 21, 2023]. Retrieved from the Internet: <https://ntrs.nasa.gov/api/citations/19680010861/downloads/19680010861.pdf>.
Mueller, Thomas J., et al.; "Analytical and Experimental Study of Axisymmetric Truncated Plug Nozzle Flow Fields"; Final Report TN-601-FR-10; Prepared by University of Notre Dame for NASA; Sep. 1972; 134 Pages [retrieved on Mar. 21, 2023]. Retrieved from the Internet: <https://ntrs.nasa.gov/api/citations/19730003555/downloads/19730003555.pdf>.
Stitt, Leonard E.; "Exhaust Nozzles for Propulsion Systems With Emphasis on Supersonic Cruise Aircraft"; NASA Reference Publication 1235; May 1990; 107 Pages [retrieved on Mar. 21, 2023]. Retrieved from the Internet: <https:// ntrs.nasa.gov/citations/19900011721>.
Aukerman, Carl A.; "Plug Nozzles—The Ultimate Customer Driven Propulsion System"; NASA Contractor Report 187169; AIAA-91-2208; Aug. 1991; 27 Pages [retrieved on Mar. 21, 2023]. Retrieved from the Internet: <https:// ntrs.nasa.gov/citations/19920013861>.
Bradley, Linda L.; "Descriptive Finding Guide for Philip Bono Personal Papers"; Jul. 8, 2016 [retrieved on Mar. 21, 2023]. Retrieved from the Internet: <https://sandiegoairandspace.org/files/Bono,_Philip-FG-SC.10166.doc>.
"Bono, Philip," Web page <http://www.astronautix.com/b/bono.html>, 6 pages [retrieved on Mar. 20, 2023].
"Hyperion SSTO," Web page <http://www.astronautix.com/h/hyperionssto.html>, 3 pages [retrieved on Mar. 20, 2023].
"Ithacus," Web page <http://www.astronautix.com/i/ithacus.html>, 3 pages [retrieved on Mar. 20, 2023].
"Pegasus VTOVL," Web page <http://www.astronautix.com/p/pegasusvtovl.html>, 4 pages [retrieved on Mar. 20, 2023].
"Project Selena," Web page <http://www.astronautix.com/p/projectselena.html>, 3 pages [retrieved on Mar. 20, 2023].
Extended European Search Report issued in related EP Pat. App. No. 22812352.7, dated Feb. 4, 2025, 9 pages.

* cited by examiner

ATMOSPHERIC RE-ENTRY VEHICLE WITH SKEWED BASE HEAT SHIELD

CROSS-REFERENCE TO RELATED APPLICATIONS

The present application is a continuation of U.S. patent application Ser. No. 18/554,587, filed Oct. 9, 2023, which is a U.S. National Stage Entry of International Application No. PCT/US22/71686, filed Apr. 13, 2022, which claims priority to U.S. Provisional Patent Application No. 63/236,002, filed on Aug. 23, 2021, and U.S. Provisional Patent Application No. 63/174,323, filed on Apr. 13, 2021, the contents of which are incorporated by reference herein in their entirety.

TECHNICAL FIELD

The present disclosure generally relates to the aerodynamic shape of vehicles that travel at or above hypersonic speeds, as well as heat shields, nozzles, and engines for such vehicles. The present disclosure more particularly relates to a non-axisymmetric heat shield, a nozzle defined at least partially by the heat shield, an engine including the nozzle, and a vehicle including the engine.

BACKGROUND

Aircraft-like reusability for rockets has long been the "holy grail" of rocketry due to the potential for large cost benefits. The ability to recover and reuse an upper stage rocket of a multi-stage rocket system (e.g., the second stage rocket of a two-stage rocket system) remains a significant technical gap that has not yet been solved by the industry. Reusing the upper stage of a multi-stage rocket is challenging due to the harsh re-entry environment and the performance penalties associated with increased structural mass required for withstanding the re-entry environment and guiding the vehicle to a precise landing location. Upper stage rockets are typically constructed with the minimum structure and complexity since any mass addition to the second stage is a 1:1 reduction in payload capacity. Reusing an upper stage rocket therefore requires significant additional functionality but with minimal mass addition.

Rockets and other vehicles that travel at or above hypersonic speeds (e.g., space re-entry vehicles, aircraft, missiles, etc.) within a planetary atmosphere require a means to protect themselves from the heating that occurs at such high speeds. Conventional solutions for mitigating such heating include use of one or more of the following: (i) ablative materials, which undergo pyrolysis and generate gases that move downstream in a boundary layer to form a protective film layer; (ii) high-temperature materials (e.g., ceramics, carbon-carbon, etc.); (iii) composite materials, which insulate a base material and radiate heat away therefrom; and (iv) transpiration cooling, which involves use of a thin protective film that is provided by a gas passing through a semi-porous wall. These conventional solutions for mitigating heating have detrimental cost, operations, and mass impacts for certain applications, such as reusable vehicles. It is therefore advantageous to minimize the vehicle area and associated mass which must be protected with such a heat shield.

To reduce the operations cost and turnaround time of a reusable space re-entry vehicle, it is advantageous to control the vehicle to land at a precise location that is configured to limit the damage to the vehicle during the landing event (e.g., a prepared concrete surface or landing zone).

Achieving controlled landing requires the ability to maneuver during atmospheric re-entry and counteract trajectory disturbances during flight. The very large nozzle engines (e.g., bell nozzle engines) that are traditionally used for upper stage rockets have limitations that prevent their use as propulsive landing systems for upper stage rockets. In particular, large nozzle engines are typically optimized for efficiency only in a vacuum, and therefore experience relatively poor performance during atmospheric operation (i.e., during re-entry and landing). Moreover, large nozzle engines are difficult to protect during re-entry because they are very thin and incur severe flow separation and side loads in the atmosphere. Adding a secondary propulsion system to an upper stage rocket to allow for controlled landing is unfeasible due to detrimental cost and mass impacts.

Applicant's recent efforts to overcome these and other problems have focused on use of an aerospike nozzle engine. The aerospike nozzle engine minimizes the nozzle efficiency loss due to pressure drag, which allows it to operate inside the atmosphere at a low throttle level, whereas flow separation would occur in large nozzle engines, resulting in unsteady thrust oscillations, unsteady thrust vectoring, and engine or vehicle damage. Referring to FIG. 1, a prior art aerospike engine 114 includes at least one high pressure chamber 150 (e.g., a combustion chamber) and an aerospike nozzle 112. Referring to FIG. 2, the prior art aerospike nozzle 112 includes at least one initial nozzle portion 152 through which exhaust gas initially exits the high pressure chamber 150, and a secondary nozzle portion 153 downstream relative to the initial nozzle portion 152. The initial nozzle portion 152 includes at least one throat 154 that extends annularly about an axis 157 of the initial nozzle portion 152. The initial nozzle portion 152 is typically in the form of a converging-diverging nozzle. The secondary nozzle portion 153 includes a centerbody 140 (e.g., the aerospike) (see FIG. 1) defining an inner expansion surface 155. The prior art aerospike engine 114 and improvements thereto are discussed in more detail in the commonly-assigned U.S. Provisional Patent Application No. 63/236, 002, filed on Aug. 23, 2021, U.S. Provisional Patent Application No. 62/941,386, filed Nov. 27, 2019, and in the International Patent Application No. PCT/US2020/048178, filed Aug. 27, 2020 and claiming priority to U.S. Provisional Patent Application No. 62/941,386, the contents of which are incorporated herein by reference in their entirety.

In addition to maneuverability, a vehicle must also have sufficient aerodynamic lift capability in order to slow down during atmospheric re-entry and achieve a controlled landing. Prior art re-entry vehicles that achieved precision landing were typically lifting bodies, such as the Space Shuttle. These vehicles achieved large lift-to-drag ratios and substantial maneuvering capability, but came with the expense of a large heat shield area and several actively controlled aerodynamic surfaces on the underside of the winged vehicle. Other prior art re-entry vehicles minimized the additional mass of the heat shield by exposing only a relatively small base area of the vehicle to the re-entry environment. These re-entry vehicles generated lift-to-drag ratios sufficient to slow them down during atmospheric re-entry and achieve a somewhat controlled landing, but they lacked a propulsion system or other means for maneuvering and were thus unable to land at precise locations.

One such prior art vehicle is the re-entry vehicle 216 of the Apollo spacecraft, which is schematically illustrated in FIGS. 3 and 4. This prior art vehicle 216 was in the form of a capsule that extended along a linear centerline 230 between a forward end 220 and an opposing aft end 222 thereof. The aft end 222 defined the windward side of the vehicle 216 during atmospheric re-entry. The prior art vehicle 216 included a heat shield 240 defining an heat shield outer surface on the windward side, and an annular sidewall 236 disposed at an angle θ (hereinafter the "sidewall angle θ") of thirty-three degrees (33°) relative to planes 238, 239 parallel to the centerline 230. The heat shield surface 240 and the vehicle 216 as a whole were at least substantially axisymmetric relative to the centerline 230. Referring to FIG. 3, the prior art vehicle 216 would initially re-enter the atmosphere at a so-called zero angle of attack, in which the vehicle 216 was oriented such that the centerline 230 was parallel to the direction of travel 260. In the zero angle of attack orientation, the center of gravity 262 and the center of pressure 264 of the vehicle 216 were in a plane 266 offset relative to the direction of travel 260.

During flight, the aerodynamic lift and drag forces on the vehicle 216 would have generated pitching moments about the center of gravity 262, and the vehicle 216 would have naturally adopted an orientation at which those moments were balanced, which is known as the aerodynamic trim point. In this orientation, shown in FIG. 4, the center of gravity 262 and the center of pressure 264 of the vehicle 216 would have been in a plane 266 parallel to the direction of travel 260. In this orientation, opposing sides of the vehicle 216 would have been disposed at different respective angles $\varphi_1$, $\varphi_2$ relative to planes 270, 271 parallel to the direction of travel 260. The center of gravity 262 and the center of pressure 264 of the prior art vehicle 216 would have been selected to achieve a particular non-zero angle of attack during atmospheric re-entry. This is because increasing the angle of attack increases the lift-to-drag ratio of the vehicle 216. To achieve a sufficiently high lift-to-drag ratio while also avoiding potentially catastrophic exposure of the sidewall 236 to the high enthalpy flow 268 moving relative to the vehicle 216 in a direction opposite the direction of travel 260, the prior art vehicle 216 had to be designed with a relatively steep sidewall angle θ (i.e., the sidewall angle θ has a relatively high magnitude).

The magnitude of the sidewall angle θ is inversely related to the volume of the vehicle 216, and thus a design with a steep sidewall angle θ may be undesirable for some applications. If the purpose of a vehicle 216 is to deliver cargo, for example, then a steeper sidewall angle θ means less volume for storing cargo.

Aspects of the present invention are directed to these and other problems.

SUMMARY

According to an aspect of the present invention, a heat shield for protecting a windward side of a vehicle from a high enthalpy flow includes a centerbody sidewall and a centerbody base extending aft of the centerbody sidewall. The centerbody sidewall and the centerbody base define a heat shield outer surface that is non-axisymmetric.

According to another aspect of the present invention, an aerospike nozzle includes a throat and a centerbody extending aft of the throat. The centerbody includes a centerbody sidewall defining an expansion surface, and a centerbody base extending aft of the centerbody sidewall. The centerbody sidewall and the centerbody base define a heat shield outer surface that is non-axisymmetric.

According to another aspect of the present invention, an engine includes a high pressure chamber and an aerospike nozzle that exhausts gas generated by the high pressure chamber. The aerospike nozzle includes a throat and a centerbody extending aft of the throat. The centerbody includes a centerbody sidewall defining an expansion surface, and a centerbody base extending aft of the centerbody sidewall. The centerbody sidewall and the centerbody base define a heat shield outer surface that is non-axisymmetric.

According to another aspect of the present invention, a vehicle includes an engine including a high pressure chamber, and an aerospike nozzle that exhausts gas generated by the high pressure chamber. The aerospike nozzle includes a throat and a centerbody extending aft of the throat. The centerbody includes a centerbody sidewall defining an expansion surface, and a centerbody base extending aft of the centerbody sidewall. The centerbody sidewall and the centerbody base define a heat shield outer surface that is non-axisymmetric.

According to another aspect of the present invention, a re-usable upper stage rocket of a multi-stage rocket system includes a re-entry heat shield surface on the base of the upper stage rocket. The re-entry heat shield surface has a non-axisymmetric shape which generates lift at a zero angle of attack.

In addition to, or as an alternative to, one or more of the features described above, further aspects of the present invention can include one or more of the following features, individually or in combination:

the centerbody sidewall and the centerbody base collectively form a blunt body;

the centerbody sidewall includes a rigid wall with a cone shape;

the centerbody sidewall has a truncated and oblique cone shape;

the centerbody base has at least one of a semi-spherical shape, a frustoconical shape, a multi-conic shape, and an ellipsoidal shape;

at least one of the centerbody sidewall and the centerbody base is actively cooled;

the centerbody is a truncated toroidal aerospike;

the vehicle is an upper stage rocket;

the vehicle is an atmospheric re-entry vehicle;

the centerbody is a truncated toroidal aerospike and the centerbody base partially defines an aft end of the vehicle;

the vehicle includes a main body portion defining a forward end of the vehicle and a base portion defining an aft end of the vehicle, and the main body portion is at least substantially axisymmetric relative to a main body centerline extending in a direction between a forward end of the main body portion and an aft end of the main body portion;

the heat shield outer surface is non-axisymmetric relative to the main body centerline;

the heat shield outer surface is configured such that net aerodynamic forces acting on the centerbody during atmospheric re-entry are at an angle relative to the main body centerline;

the heat shield outer surface is configured such that net aerodynamic forces acting on the centerbody generate lift during atmospheric re-entry at a zero angle of attack;

the engine and the aerospike nozzle are configured such that the aerospike nozzle exhausts gas generated by the high pressure chamber in a direction toward the aft end of the vehicle; and the centerbody sidewall and the centerbody base are components of the heat shield.

These and other aspects of the present invention will become apparent in light of the drawings and detailed description provided below.

DETAILED DESCRIPTION

Referring to FIGS. 6-9, the present disclosure describes a non-axisymmetric heat shield 10, a nozzle 12 defined by at least a portion of the heat shield 10, an engine 14 including the nozzle 12, and a vehicle 16 including the engine 14.

Figures 5, 6:
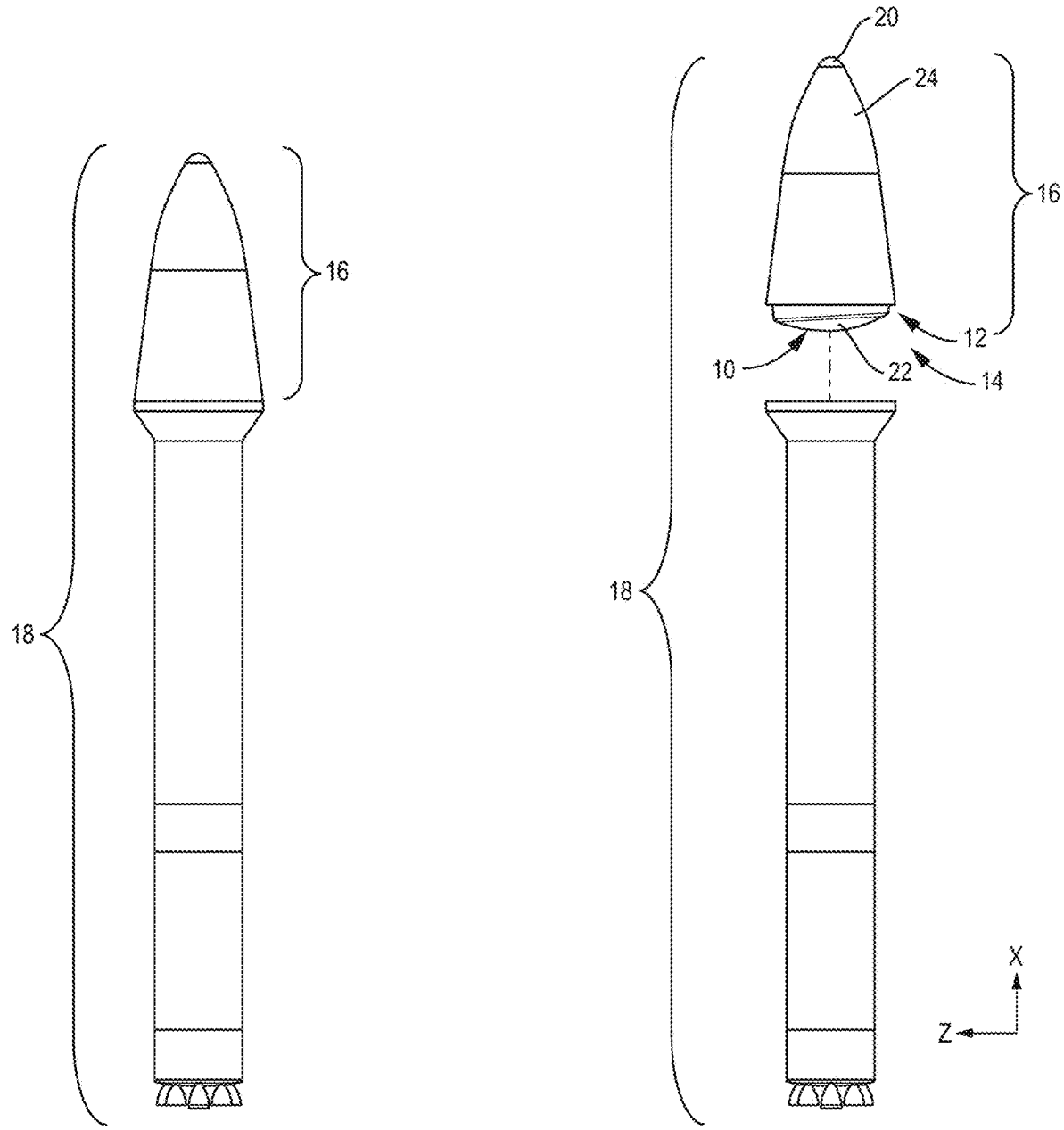
FIG. 5 is an elevation view of a two-stage rocket system including an upper stage rocket with the present non-axisymmetric heat shield.
FIG. 6 is an exploded elevation view of the two-stage rocket system of FIG. 5.
Figure 7:
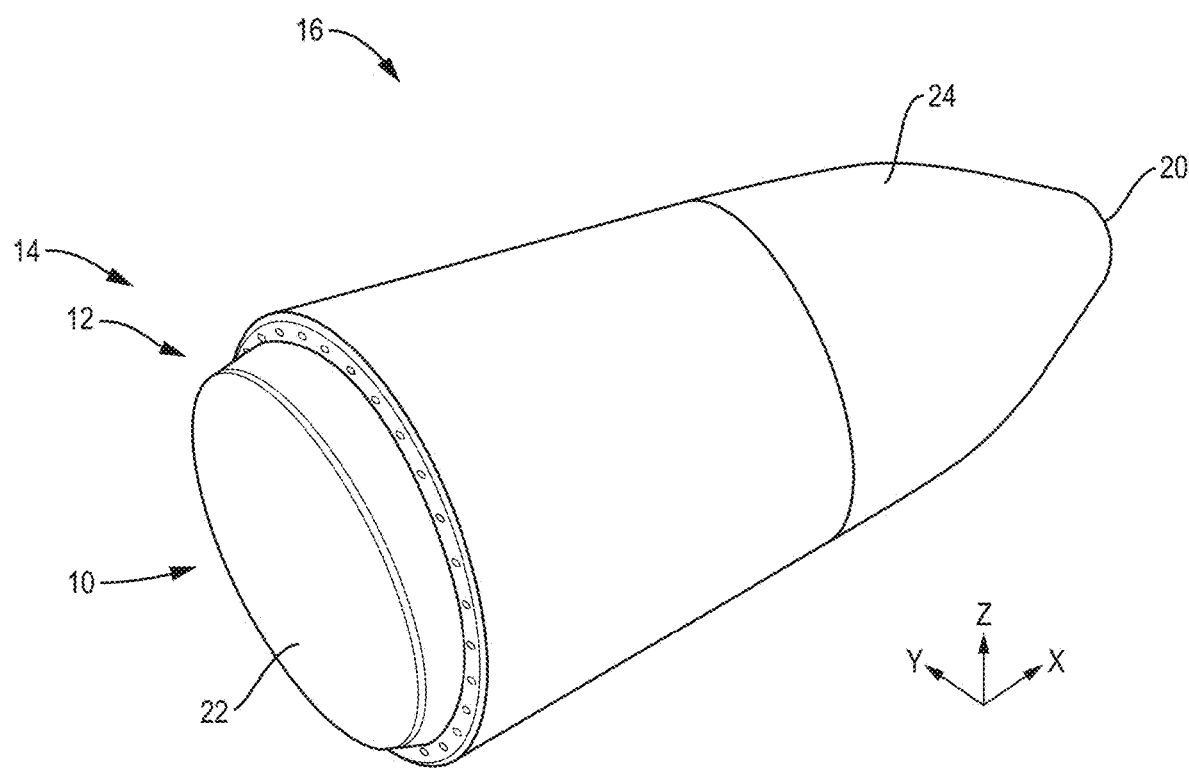
FIG. 7 is a perspective view of the upper stage rocket of FIG. 5.

The vehicle 16 is a rocket (e.g., a multi-stage rocket, a single-stage-to-orbit (SSTO) rocket, an upper stage rocket, a booster rocket, etc.), a missile, a spacecraft, an aircraft, or another vehicle designed for travel (e.g., flight) up to at least supersonic speeds (e.g., supersonic speeds, hypersonic speeds, re-entry speeds, etc.) in atmospheric, sub-orbital, orbital, extraterrestrial, and/or outer space environments. Referring to FIG. 5, in the illustrated embodiment, the vehicle 16 is a reusable second stage rocket of a two-stage rocket system 18. Referring to FIGS. 6 and 7, the vehicle 16 extends between a forward end 20 and an opposing aft end 22. The vehicle 16 includes a payload housing 24 proximate the forward end 20, and an engine 14 proximate the aft end 22. The aft end 22 defines the windward side of the vehicle 16 during atmospheric re-entry, for example.

Figure 8:
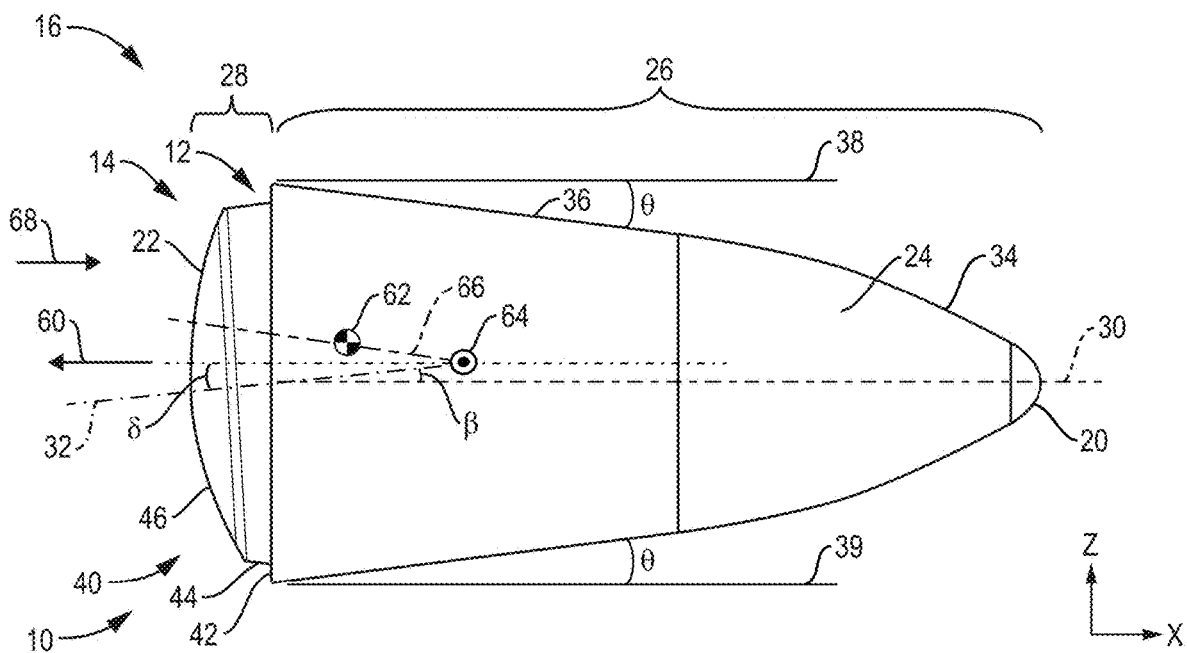
FIG. 8 is an elevation view of the upper stage rocket of FIG. 5 in a zero angle of attack orientation.
Figure 9:
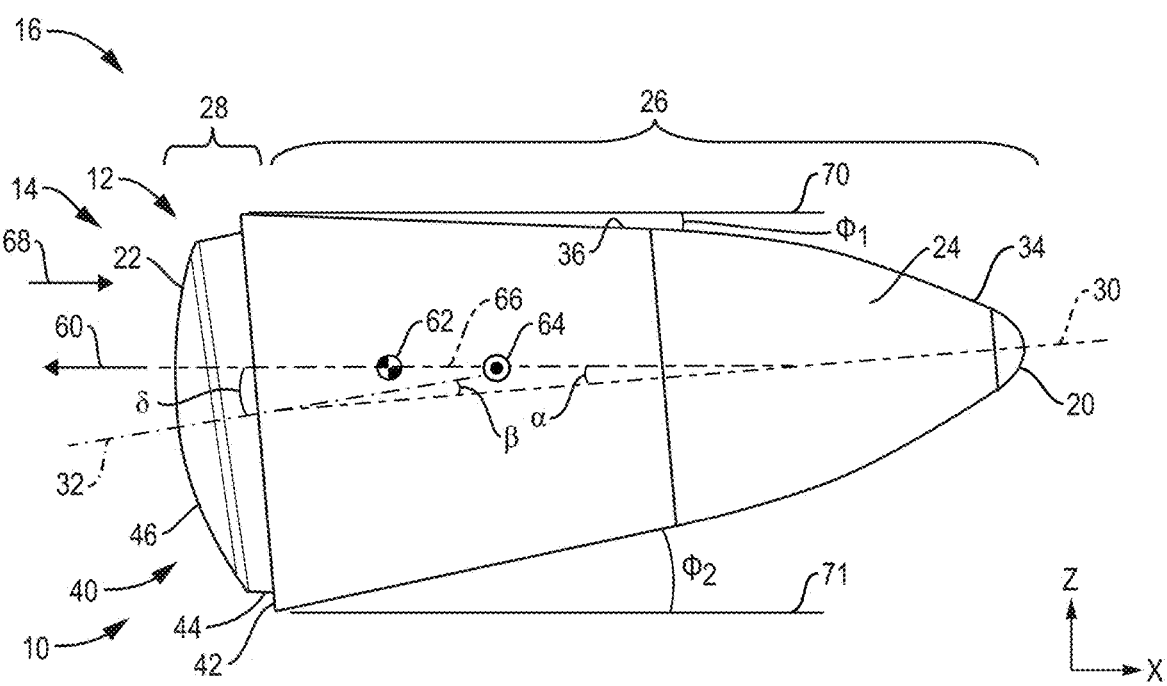
FIG. 9 is an elevation view of the upper stage rocket of FIG. 5 in a non-zero angle of attack orientation.

Referring to FIGS. 8 and 9, the vehicle 16 includes a main body portion 26 defining the forward end 20 of the vehicle 16, and a base portion 28 defining the aft end 22 of the vehicle 16. The main body portion 26 is shaped such that the outer surface thereof is at least substantially axisymmetric relative to a main body centerline 30 (e.g., a linear centerline perpendicular to the tangent of the forwardmost point of the main body portion 26) extending in a direction between a forward end of the main body portion 26 (i.e., the forward end 20 of the vehicle 16) and an aft end of the main body portion 26. The base portion 28 includes a heat shield 10 defining a heat shield outer surface, which is on the windward side of the vehicle 16 during atmospheric re-entry, for example. The heat shield 10 is configured such that heat shield outer surface is non-axisymmetric relative to the main body centerline 30, and is non-axisymmetric relative to a heat shield centerline 32 (e.g., a linear centerline perpendicular to the tangent of the aftmost point of the heat shield 10) extending in a direction between a forward end of the heat shield 10 and an aft end of the heat shield 10 (e.g., the aft end 22 of the vehicle 16). The main body portion 26 and the heat shield 10 of the vehicle 16 are therefore configured such that the heat shield centerline 32 is offset relative to the main body centerline 30 by an angle β. The angle β is typically within the range of 1° to 10°. In the illustrated embodiment, the angle β is 4°. In other embodiments, the angle β is approximately 1°, 2°, 3°, 5°, 6°, 7°, 8°, 9°, or 10°, for example. In some embodiments, including the illustrated embodiment, at least one portion of the heat shield outer surface is at least substantially axisymmetric relative to the heat shield centerline 32, as will be discussed in more detail below.

Figure 3:
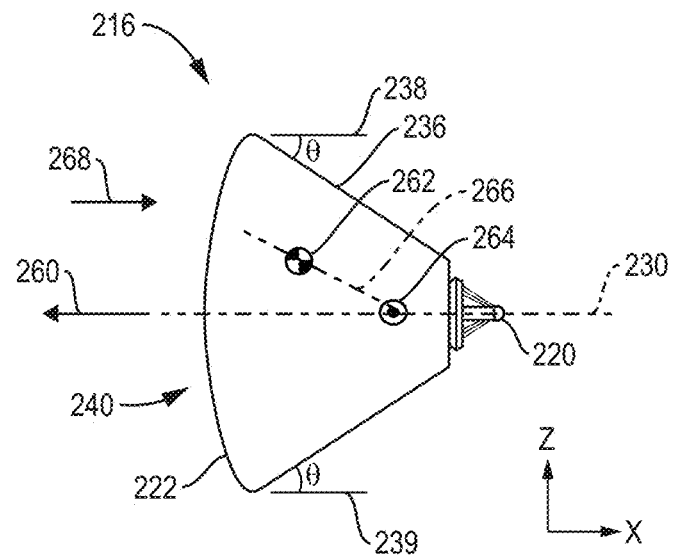
FIG. 3 schematically illustrates a prior art vehicle (i.e., the re-entry vehicle of the Apollo spacecraft) with an axisymmetric heat shield in a zero angle of attack orientation.
Figure 4:
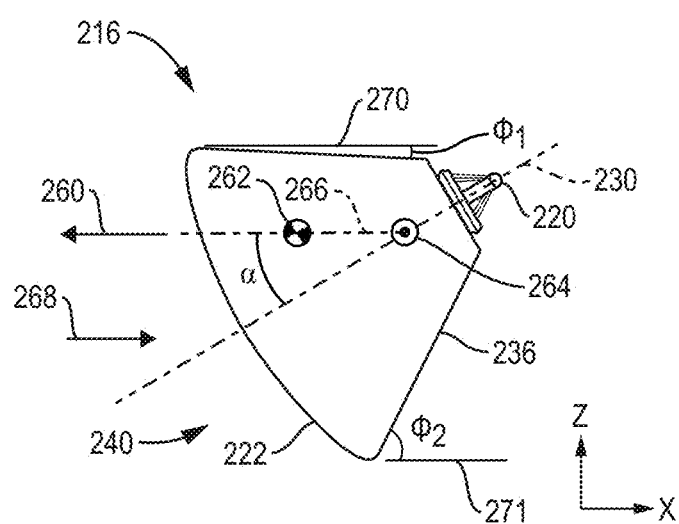
FIG. 4 schematically illustrates the prior art vehicle of FIG. 3 in a non-zero angle of attack orientation.

Referring still to FIGS. 8 and 9, the main body portion 26 of the vehicle 16 includes a nose 34 and a sidewall 36 extending aft of the nose 34. In the illustrated embodiment, the nose 34 includes a rigid wall with a rounded cone shape, and the sidewall 36 includes a rigid wall with a frustoconical shape. The sidewall 36 at least partially defines a payload housing 24 in which a payload (e.g., cargo, munitions, etc.) is stored during transport by the vehicle 16. The sidewall 36 further surrounds one or more internal components of the vehicle 16, such as one or more components of the engine 14 and/or one or more components of a system for actively cooling the heat shield 10 (e.g., a tank, a pump, a turbine, etc.). The sidewall 36 is disposed at an angle θ (hereinafter the "sidewall angle θ") relative to planes 38, 39 parallel to the main body centerline 30. In the illustrated embodiment, the vehicle 16 is designed with a relatively shallow sidewall angle θ (i.e., the sidewall angle θ has a low high magnitude) in comparison to the prior art vehicle 216 of FIGS. 3 and 4. The sidewall angle θ is within the range of 0° to 90°. In some embodiments, the sidewall angle θ is within the range of 5° to 15°. In the illustrated embodiment, for example, the sidewall angle θ is 7°. The magnitude of the sidewall angle θ is inversely related to the volume of the vehicle 16, and thus the shallow sidewall angle θ advantageously allows the vehicle 16, and in particular the payload housing 24, to have a larger volume than that of the prior art vehicle 216.

Figure 10:
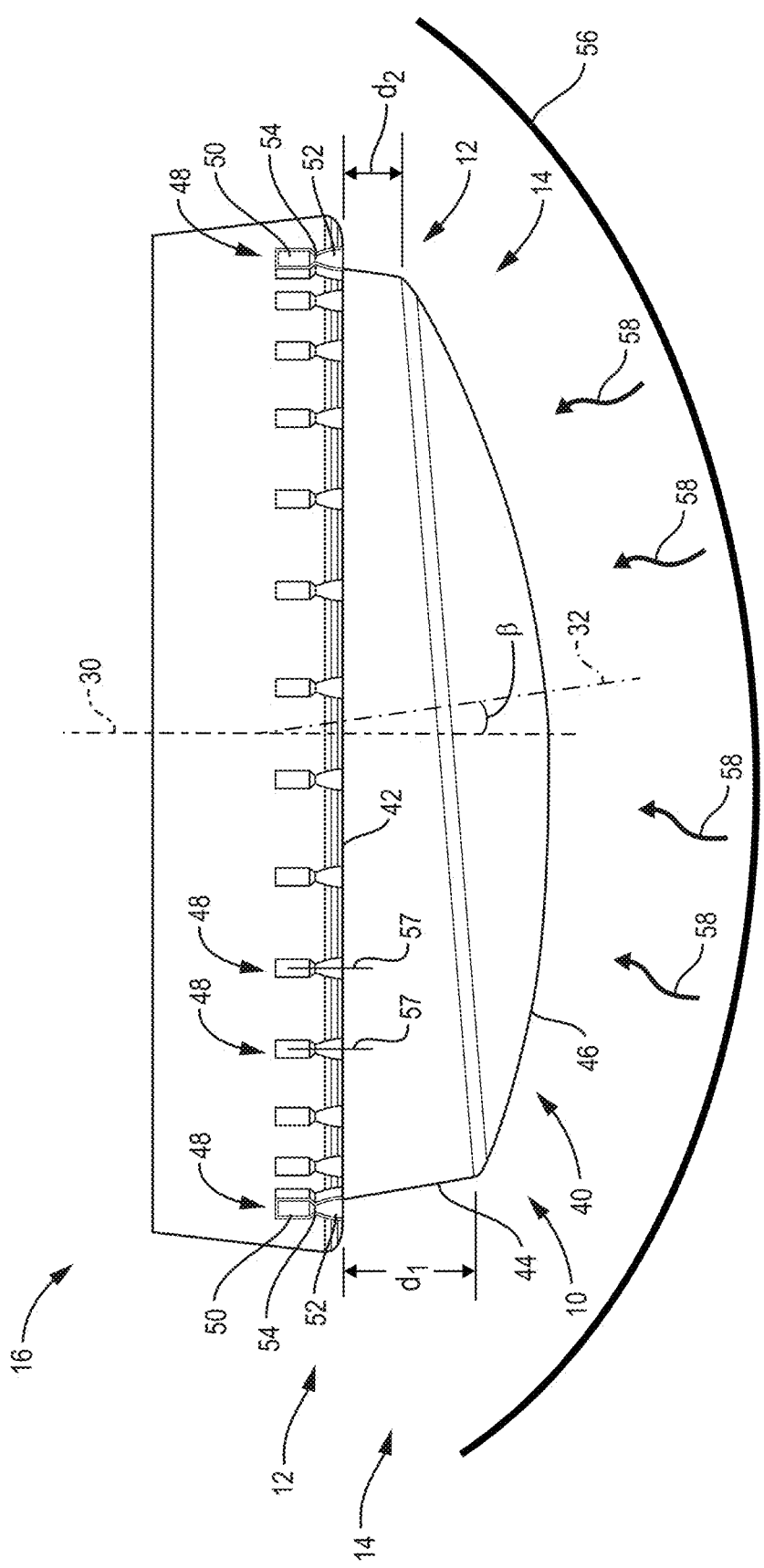
FIG. 10 is an elevation view of that aft end of the upper stage rocket of FIG. 5.
Figure 11:
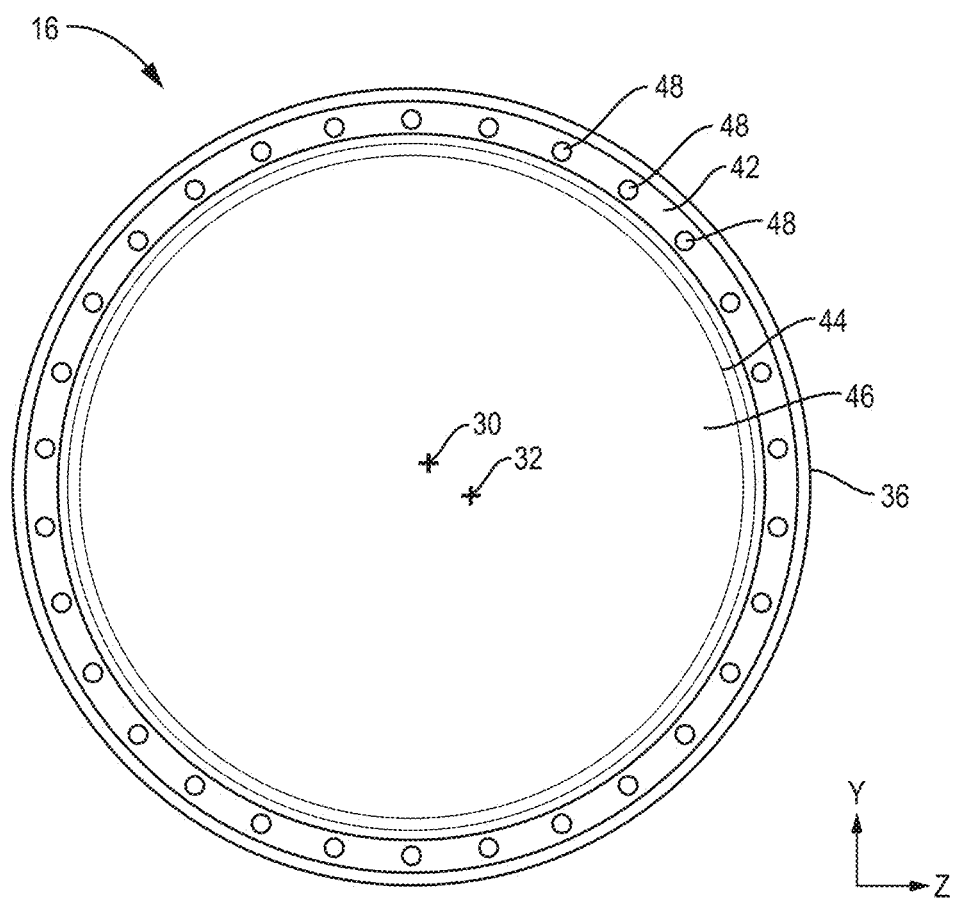
FIG. 11 is a plan view of the aft end of the upper stage rocket of FIG. 5.

Referring to FIGS. 8-10, the base portion 28 of the vehicle 16 includes one or more components that define the heat shield 10 and the outer surface thereof (i.e., the heat shield outer surface). In the illustrated embodiment, the base portion 28 includes a centerbody 40 and a thruster mount 42, which each define portions of the heat shield 10 and the heat shield outer surface. The centerbody 40 is in the form of a truncated toroidal aerospike. The centerbody 40 includes a centerbody sidewall 44 and a centerbody base 46 that collectively form a blunt body. The centerbody sidewall 44 includes a rigid wall with a truncated and oblique cone shape. The centerbody base 46 includes a rigid wall with a semi-spherical shape. In other embodiments, the centerbody base 46 additionally or alternatively includes one or more rigid walls having a frustoconical shape, a multi-conic shape (e.g., bi-conic, tri-conic, etc.), an ellipsoidal shape, and/or another blunt shape. Referring to FIGS. 10 and 11, the thruster mount 42 includes a rigid wall extending annularly about the main body centerline 30, and positioned proximate the aft end of the main body portion 26 of the vehicle 16. The thruster mount 42 includes circumferentially-spaced openings extending therethrough in a direction parallel to the main body centerline 30. Each opening in the thruster mount 42 is configured to receive a "thrust can 48" of the engine 14, which will be described in more detail below.

The heat shield outer surface defined by respective outer surfaces of the centerbody sidewall 44, the centerbody base 46, and the thruster mount 42 is non-axisymmetric relative to the main body centerline 30. In some embodiments, at least one portion of the heat shield outer surface is at least substantially axisymmetric relative to the heat shield centerline 32. In the illustrated embodiment, for example, the outer surface defined by the centerbody base 46 has a semi-spherical shape and is axisymmetric relative to the heat shield centerline 32.

In some embodiments, one or more components of the heat shield 10, including the centerbody sidewall 44, the centerbody base 46, and/or the thruster mount 42 are actively cooled using the heat shielding system disclosed in the commonly-assigned U.S. Provisional Patent Application No. 62/942,886, filed Dec. 3, 2019, and in the International Patent Application No. PCT/US2020/48226 filed Aug. 27, 2020 filed Aug. 27, 2020 and claiming priority to U.S. Provisional Patent Application No. 62/942,886, the contents of which are hereby incorporated by reference in their entirety. In some embodiments, at least a portion of the sidewall 36 of the main body portion 26 of the vehicle 16 is actively cooled in a same or similar manner.

Referring to FIG. 10, the engine 14 includes at least one high pressure chamber 50 (e.g., a combustion chamber) and a nozzle 12.

The high pressure chamber 50 generates gas that is exhausted through the nozzle 12. The high pressure chamber 50 is in the form of an annular ring, a segmented ring, individual thrust chambers, or any other configuration providing supersonic flow to the nozzle 12.

The nozzle 12 is an aerospike nozzle having at least one initial nozzle portion 52 through which exhaust gas initially exits at least one high pressure chamber 50, and a secondary nozzle portion downstream relative to the initial nozzle portion 52. The initial nozzle portion 52 includes at least one throat 54 and is typically in the form of a converging-diverging nozzle.

Figure 1:
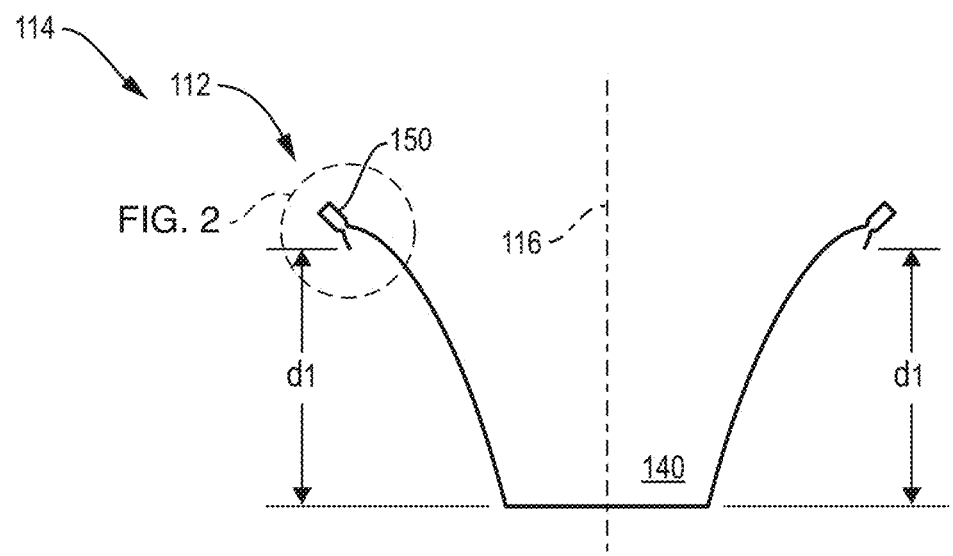
FIG. 1 schematically illustrates a prior art aerospike engine and nozzle.

Referring still to FIG. 10, the nozzle 12 is defined by at least a portion of the heat shield 10. In the illustrated embodiment, the secondary nozzle portion of the nozzle 12 is defined by the centerbody 40. The centerbody sidewall 44 functions as an expansion surface of the nozzle 12 in addition to its function as a portion of the heat shield 10. The centerbody sidewall 44 is non-axisymmetric relative to the heat shield centerline 32, and thus the nozzle 12 is non-axisymmetric relative to the heat shield centerline 32. As shown in FIG. 10, the initial nozzle portion 52 and the centerbody base 46 are separated by respective first and second distances $d_1$, $d_2$ on opposing sides of the vehicle 16. The first and second distances $d_1$, $d_2$ differ from one another due to the non-axisymmetric shape of the nozzle 12. This in contrast to the prior art aerospike nozzle 112 shown in FIG. 1, in which the initial nozzle portion 52 and the centerbody base 46 are separated by a same distance $d_1$ on opposing sides of the vehicle 16.

The engine 14 and the nozzle 12 can be configured in various different ways. In the illustrated embodiment, the engine 14 has a so-called "plug cluster" configuration. That is, the engine 14 includes a plurality of discrete high pressure chambers 50 spaced relative to one another and a plurality of discrete initial nozzle portions 52 spaced relative to one another. Each initial nozzle portion 52 is disposed relative to a corresponding high pressure chamber 50, and is configured to exhaust gas exiting the respective high pressure chamber 50. Each high pressure chamber 50 and initial nozzle portion 52 pair is known in the art as a "thrust can 48." The initial nozzle portion 52 of each thrust can 48 includes a discrete throat 54. Referring to FIG. 11, the thrust cans 48 are circumferentially spaced relative to the main body centerline 30. In other embodiments, the engine 14 may include a single high pressure chamber 50 that extends annularly about the main body centerline 30, and a single initial nozzle portion 52 with a single throat 54 that extends annularly about the main body centerline 30.

Figure 2:
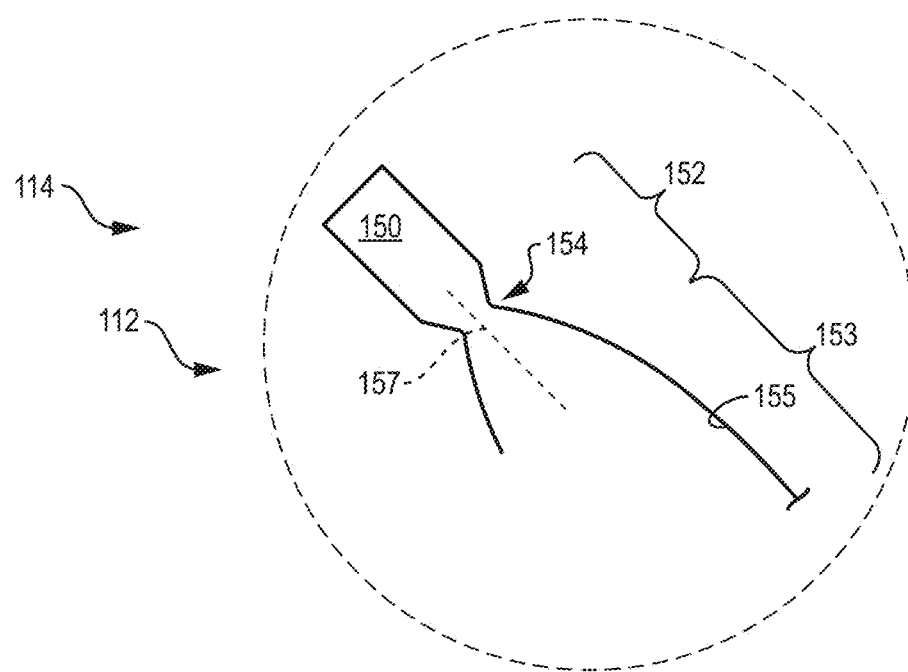
FIG. 2 schematically illustrates a portion of the prior art aerospike engine and nozzle of FIG. 1.

Referring to FIG. 10, in the illustrated embodiment, each thrust can 48 is configured such that the throat 54 extends annularly about an axis 57 of the initial nozzle portion 52, and such that the axis 57 is parallel to the main body centerline 30. This is in contrast to the prior art aerospike nozzle 112 in FIGS. 1 and 2, for example, in which the axis 157 is angled (i.e., not parallel) relative to the centerline 116 of the vehicle on which the nozzle 112 is disposed. In other embodiments of the present engine 14 and nozzle 12, each thrust can 48 is configured such that the axis 57 of the initial nozzle portion 52 is angled relative to the main body centerline 30.

During operation, the vehicle 16 moves through an environment (e.g., the atmosphere, space) at freestream Mach numbers that can approach Mach thirty (30). During operation in vacuum conditions, exhaust plumes from the various thrust cans 48 of the engine 14 merge to form an aerodynamic spike which traps a positive pressure along the centerbody base 46 of the heat shield 10. This generates additional thrust and improves the overall efficiency of the engine 14 and the vehicle 16. Referring to FIG. 10, during atmospheric flight, a bow shock 56 is formed upstream of the vehicle 16, and temperature on the vehicle side of the bow shock 56 can reach thousands of degrees Kelvin. The bow shock 56 generates significant drag to reduce the velocity of the vehicle 16, and also generates significant aerodynamic heating 58 on the heat shield 10, thereby necessitating cooling and/or other thermal protection for reusability, such as the above-mentioned active cooling system.

Referring again to FIG. 8, the vehicle 16 may initially re-enter the atmosphere at a so-called zero angle of attack (i.e., $\alpha=0°$), in which the vehicle 16 is oriented such that the main body centerline 30 is parallel to the direction of travel 60. In this orientation, the heat shield centerline 32 is offset relative to the direction of travel 60 by an angle δ equal to the angle β at which the heat shield centerline 32 is offset relative to the main body centerline 30. In the zero angle of attack orientation, the center of gravity 62 and the center of pressure 64 of the vehicle 16 are in a plane 66 offset relative to the direction of travel 60. The fact that the centerbody base 46 of the heat shield 10 is axisymmetric about the heat shield centerline 32, which is offset at the angle β relative to the main body centerline 30, advantageously causes a net lift force on the vehicle 16 relative to the direction of travel 60, even at the zero angle of attack.

During operation of the vehicle 16 at a zero angle of attack (FIG. 8), the aerodynamic lift and drag forces on the vehicle 16 will generate pitching moments about the center of gravity 62, and the vehicle 16 will naturally adopt an orientation at which those moments are balanced (i.e., the aerodynamic trim point). This orientation, shown in FIG. 9, increases an angle α between the centerbody base 46 and the high enthalpy flow 68 that is moving relative to the vehicle 16 in a direction opposite the direction of travel 60. The non-zero angle of attack orientation (FIG. 9) therefore generates additional lift than the zero angle of attack orientation (FIG. 8). In the non-zero angle of attack (FIG. 9), the plane 66 of the center of gravity 62 and the center of pressure 64 will be parallel relative to the direction of travel 60, and opposing sides of the vehicle 16 will be at different respective angles φ1, φ2 relative to planes 70, 71 parallel to the direction of travel 60. The heat shield centerline 32 is offset relative to the direction of travel 60 by an angle δ equal to the sum of: (i) the angle α between the centerbody base 46 and the high enthalpy flow 68; and (ii) the angle β at which the heat shield centerline 32 is offset relative to the main body centerline 30. The angle of attack α should not exceed the sidewall angle θ. Thus, in the illustrated embodiment, the vehicle 16 should not be flown at an angle of attack α that exceeds 7°. Maintaining the angle of attack α below this threshold prevents the high enthalpy flow 68 from impinging on the sidewall 36 of the vehicle 16, eliminating the need for additional heat shielding (and the accompanying additional mass) on those surfaces the sidewall 36. The center of gravity 62 and the center of pressure 64 of the vehicle 16 can be selected to achieve a particular non-zero angle of attack during atmospheric re-entry.

The non-axisymmetric nature of the heat shield 10 (e.g., the oblique angle β of the centerbody base 46 relative to the main body centerline 30) allows the vehicle 16 to achieve a higher lift-to-drag ratio within a certain angle of attack constraint. That is, the vehicle 16 can achieve a certain target lift-to-drag ratio with a lower range of angles of attack α. This allows a shallower sidewall angle θ while still preventing hypersonic flow 68 from impinging on the sidewall 36 of the vehicle 16. This in turn allows for increased volume available for other system uses (e.g., propellant, payload, etc.).

To minimize the additional mass of the heat shield 10 and aerodynamic controls, the vehicle 16 exposes only the relatively small heat shield 10 of the vehicle 16 to the high enthalpy flow 68, while also generating a sufficient lift-to-drag ratio for precise maneuvering and landing. By adjusting both the angle β of the centerbody base 46 relative to the main body centerline 30, and the location of the center of gravity 62, the design of the vehicle 16 can be adjusted to produce different amounts of lift while maintaining the same trimmed angle of attack α. This adds freedom in the design space which is not available for traditional axisymmetric vehicle shapes. The combined surfaces of the heat shield 10 and nozzle 12 are advantageous in that they result in a lower mass penalty for the heat shield 10 in a reusable upper stage application.

While several embodiments have been disclosed, it will be apparent to those having ordinary skill in the art that aspects of the present invention include many more embodiments. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. An atmospheric re-entry vehicle, comprising:
    a main body defining a forward end of the vehicle;
    a base defining an aft end of the vehicle; and
    a heat shield at the base, the heat shield including a heat shield outer surface;
    wherein the main body and the heat shield are configured such that a centerline of the heat shield is offset relative to a centerline of the main body; and
    wherein at least a portion of the heat shield outer surface is at least substantially axisymmetric relative to the centerline of the heat shield.

2. The atmospheric re-entry vehicle of claim 1, wherein the main body includes a main body outer surface that is at least substantially axisymmetric relative to the centerline of the main body.

3. The atmospheric re-entry vehicle of claim 1, wherein the centerline of the main body extends in a direction between the forward end of the vehicle and an aft end of the main body; and
    wherein the centerline of the heat shield extends in a direction between a forward end of the heat shield and an aft end of the heat shield.

4. The atmospheric re-entry vehicle of claim 1, wherein the centerline of the main body is perpendicular to a tangent of a forwardmost point of the main body; and
    wherein the centerline of the heat shield is perpendicular to a tangent of an aftmost point of the heat shield.

5. The atmospheric re-entry vehicle of claim 1, wherein the centerline of the heat shield is offset relative to the centerline of the main body by an offset angle within a range of 1° to 10°.

6. The atmospheric re-entry vehicle of claim 1, wherein the heat shield outer surface is configured such that net aerodynamic forces acting on the heat shield outer surface during atmospheric re-entry are at an angle relative to the centerline of the main body.

7. The atmospheric re-entry vehicle of claim 1, wherein the heat shield outer surface is configured such that net aerodynamic forces acting on the heat shield outer surface generate lift during atmospheric re-entry at a zero angle of attack.

8. The atmospheric re-entry vehicle of claim 1, wherein the heat shield is actively cooled.

9. The atmospheric re-entry vehicle of claim 1, wherein the vehicle is a rocket.

10. The atmospheric re-entry vehicle of claim 1, wherein the vehicle is a re-usable upper stage rocket of a multi-stage rocket system.

11. The atmospheric re-entry vehicle of claim 1, further comprising a nozzle including a throat and a centerbody extending aft of the throat;
    wherein the centerbody defines the at least a portion of the heat shield outer surface that is at least substantially axisymmetric relative to the centerline of the heat shield.

12. The atmospheric re-entry vehicle of claim 11, wherein the nozzle is an aerospike nozzle.

13. The atmospheric re-entry vehicle of claim 1, further comprising:
    a high pressure chamber; and
    a nozzle that exhausts gas from the high pressure chamber, the nozzle including a throat and a centerbody extending aft of the throat;
    wherein the centerbody defines the at least a portion of the heat shield outer surface that is at least substantially axisymmetric relative to the centerline of the heat shield.

14. The atmospheric re-entry vehicle of claim 13, wherein the centerbody is a truncated toroidal aerospike.

15. The atmospheric re-entry vehicle of claim 1, further comprising:
    a high pressure chamber; and a nozzle that exhausts gas from the high pressure chamber, the nozzle including a throat and a centerbody extending aft of the throat;

wherein the centerbody includes a centerbody sidewall defining an expansion surface and a centerbody base extending aft of the centerbody sidewall.

16. The atmospheric re-entry vehicle of claim 15, wherein the centerbody is a truncated toroidal aerospike.

17. The atmospheric re-entry vehicle of claim 15, wherein the centerbody base defines the at least a portion of the heat shield outer surface that is at least substantially axisymmetric relative to the centerline of the heat shield.

18. The atmospheric re-entry vehicle of claim 15, wherein the centerbody sidewall is non-axisymmetric relative to the centerline of the heat shield.

19. The atmospheric re-entry vehicle of claim 15, wherein the centerbody sidewall and the centerbody base collectively form a blunt body.

20. The atmospheric re-entry vehicle of claim 15, wherein the centerbody sidewall includes a rigid wall with a cone shape.

21. The atmospheric re-entry vehicle of claim 15, wherein the centerbody sidewall has a truncated and oblique cone shape.

22. The atmospheric re-entry vehicle of claim 15, wherein the centerbody base has a semi-spherical shape.

23. The atmospheric re-entry vehicle of claim 15, wherein the centerbody base has a frustoconical shape.

24. The atmospheric re-entry vehicle of claim 15, wherein the centerbody base has a multi-conic shape.

25. The atmospheric re-entry vehicle of claim 15, wherein the centerbody base has an ellipsoidal shape.

26. The atmospheric re-entry vehicle of claim 15, wherein at least one of the centerbody sidewall and the centerbody base is actively cooled.

27. The atmospheric re-entry vehicle of claim 1, wherein the heat shield includes a first heat shield outer surface and a second heat shield outer surface;

wherein the first heat shield outer surface is at least substantially axisymmetric relative to the centerline of the heat shield; and wherein the second heat shield outer surface is non-axisymmetric relative to the centerline of the heat shield.

28. The atmospheric re-entry vehicle of claim 1, further comprising a plurality of thrust cans spaced relative to one another;

wherein each thrust can is disposed relative to one of a plurality of openings extending through the heat shield.

29. The atmospheric re-entry vehicle of claim 28, wherein each thrust can includes a high pressure chamber and an initial nozzle portion.

30. The atmospheric re-entry vehicle of claim 28, wherein the plurality of openings extending through the heat shield are circumferentially spaced relative to one another.

31. The atmospheric re-entry vehicle of claim 1, wherein the centerline of the main body is perpendicular to a tangent of a forwardmost point of the main body;

wherein the centerline of the heat shield is perpendicular to a tangent of an aftmost point of the heat shield;

wherein the main body includes a main body outer surface that is at least substantially axisymmetric relative to the centerline of the main body.

32. The atmospheric re-entry vehicle of claim 31, wherein the centerline of the heat shield is offset relative to the centerline of the main body by an offset angle within a range of 1° to 10°.

33. The atmospheric re-entry vehicle of claim 31, wherein the heat shield outer surface is configured such that net aerodynamic forces acting on the heat shield outer surface during atmospheric re-entry are at an angle relative to the centerline of the main body.

34. The atmospheric re-entry vehicle of claim 31, wherein the heat shield outer surface is configured such that net aerodynamic forces acting on the heat shield outer surface generate lift during atmospheric re-entry at a zero angle of attack.

35. The atmospheric re-entry vehicle of claim 31, wherein the heat shield includes a first heat shield outer surface and a second heat shield outer surface;

wherein the first heat shield outer surface is at least substantially axisymmetric relative to the centerline of the heat shield; and wherein the second heat shield outer surface is non-axisymmetric relative to the centerline of the heat shield.

36. The atmospheric re-entry vehicle of claim 31, further comprising a plurality of thrust cans spaced relative to one another;

wherein each thrust can is disposed relative to one of a plurality of openings extending through the heat shield.

* * * * *